(12) United States Patent
Sudo

(10) Patent No.: US 7,876,716 B2
(45) Date of Patent: Jan. 25, 2011

(54) BASE STATION APPARATUS AND RADIO COMMUNICATION METHOD

(75) Inventor: Hiroaki Sudo, Yokohama (JP)

(73) Assignee: Panasonic Corporation, Osaka (JP)

( * ) Notice: Subject to any disclaimer, the term of this patent is extended or adjusted under 35 U.S.C. 154(b) by 1804 days.

(21) Appl. No.: 10/311,592

(22) PCT Filed: Apr. 16, 2002

(86) PCT No.: PCT/JP02/03753

§ 371 (c)(1), (2), (4) Date: Dec. 18, 2002

(87) PCT Pub. No.: WO02/087113

PCT Pub. Date: Oct. 31, 2002

(65) Prior Publication Data

US 2003/0189917 A1   Oct. 9, 2003

(30) Foreign Application Priority Data

Apr. 19, 2001   (JP) .............................. 2001-121542

(51) Int. Cl.
*H04J 3/00* (2006.01)
(52) U.S. Cl. ...................... 370/280; 370/208; 370/294; 370/337; 370/347; 370/436; 370/442; 370/458; 455/101; 455/127.2
(58) Field of Classification Search ................. 370/347, 370/436, 442, 458, 337, 280, 294, 210, 208, 370/276, 277; 455/101, 127.1, 127.2
See application file for complete search history.

(56) References Cited

U.S. PATENT DOCUMENTS 5,371,548 A   12/1994   Williams
5,602,836 A * 2/1997   Papadopoulos et al. ..... 370/280
5,710,762 A * 1/1998   Petranovich ................ 370/280
5,959,982 A * 9/1999   Federkins et al. ........... 370/336

(Continued)

FOREIGN PATENT DOCUMENTS

EP   0986192 A2   3/2000

(Continued)

OTHER PUBLICATIONS

Supplementary Partial European Search Report dated Apr. 10, 2003.

(Continued)

*Primary Examiner*—Aung S Moe
*Assistant Examiner*—Christopher P Grey
(74) *Attorney, Agent, or Firm*—Dickinson Wright PLLC

(57) ABSTRACT

A base station (10) performs bi-directional radio communications with terminal station apparatuses using communication frames each having time slots and being composed of a first region with a predetermined open-loop period and a second region with an open-loop period shorter than the open-loop period of the first region. A level detecting section (21) detects a received level of an uplink slot configured in the second region. A transmission diversity section (14) performs diversity transmission on a downlink transmission signal assigned to a downlink slot corresponding to the uplink slot, corresponding to a result of detection of the received level. It is thereby possible to enhance the effect of improving the received quality due to transmission diversity without degrading the transmission efficiency.

9 Claims, 12 Drawing Sheets

DS : DOWNLINK SLOT
US : UPLINK SLOT

U.S. PATENT DOCUMENTS

| | | | |
|---|---|---|---|
| 6,563,881 B1* | 5/2003 | Sakoda et al. | 375/260 |
| 6,650,630 B1* | 11/2003 | Haartsen | 370/345 |
| 2002/0105918 A1* | 8/2002 | Yamada et al. | 370/294 |
| 2003/0169722 A1* | 9/2003 | Petrus et al. | 370/347 |
| 2005/0243745 A1* | 11/2005 | Stanwood et al. | 370/280 |

FOREIGN PATENT DOCUMENTS

| | | | |
|---|---|---|---|
| JP | 08-251090 | * | 9/1996 |
| JP | 08251090 | | 9/1996 |
| JP | 09008716 | | 1/1997 |
| JP | 10164652 | | 6/1998 |
| JP | 2000 031872 | | 1/2000 |
| JP | 2000 197112 | | 7/2000 |
| JP | 2000 269869 | | 9/2000 |
| JP | 2000 269929 | | 9/2000 |

OTHER PUBLICATIONS

International Search Report dated Jul. 23, 2002.
Y. Matsumoto, et al.; "A Universal Radio Access Architecture for Broadband Wireless Access Systems" NTT Wireless Systems Laboratories, SB-3-1,1999; pp. 664-665.

* cited by examiner

BASE STATION APPARATUS AND RADIO COMMUNICATION METHOD

TECHNICAL FIELD

The present invention relates to a base station apparatus that performs bi-directional radio communications with terminal stations using a TDD (Time Division Duplex) system in which time slots with the same radio frequency are used to communicate alternately over the uplink and downlink, and more particularly, to a base station apparatus that performs communications using an OFDM (Orthogonal Frequency Division Multiplexing) system.

BACKGROUND ART

As a duplex system in a mobile communication system using CDMA (Code Division Multiple Access), a TDD system is conventionally known. The TDD system uses the same frequency band for transmission and reception, called a ping-pong system, and is a system where time slots with the same radio frequency are used to communicate alternately over the uplink and downlink.

FIG. 1 illustrates an example of a configuration of a communication frame in the TDD system. The communication frame illustrated in FIG. 1 is divided into a plurality of times slots. In this communication frame, downlink time slots (downlink slots 1 to n) are configured in the first half of the frame, while uplink time slots (uplink slots 1 to n) are configured in the latter half of the frame. FIG. 1 illustrates an example where the uplink slots 1 to n are assigned corresponding uplink bursts 1 to n, while the downlink slots 1 to n are assigned corresponding downlink bursts 1 to n.

When a base station performs radio communications with terminal station apparatuses using thus configured communication frames, each terminal station apparatus is assigned an uplink slot and downlink slot contained in the communication frame. Based on a timing signal shown in FIG. 1, the base station apparatus switches between transmission processing and reception processing. A terminal station apparatus performs transmission processing and reception processing at timings of an uplink slot and downlink slot assigned to the terminal station apparatus, respectively.

Structures of an uplink burst and downlink burst will be described below with reference to FIGS. 2 and 3. FIG. 2 is a diagram illustrating a structure of a downlink burst, and FIG. 3 is a diagram illustrating a structure of an uplink burst. At a beginning of the downlink burst is disposed a propagation path estimation preamble that is a known signal and used in propagation path estimation. The propagation path estimation preamble is followed by data (downlink data #1 and #2) to a terminal station.

Downlink bursts are transmitted at respective predetermined timings from a base station apparatus, and therefore, never collide with one another. Accordingly, the downlink burst is not provided with a guard time.

Meanwhile, as shown in FIG. 3, the uplink burst is provided at its beginning with a guard time to prevent the collision with an adjacent burst, and the guard time is followed by a sync/AGC preamble used in detection of synchronization and AGC (Automatic Gain Control). The sync/AGC preamble is followed by a propagation path estimation preamble that is a known signal and used in propagation path estimation. The propagation path estimation preamble is followed by data (uplink data #3 and #4) to the base station.

In the communication frame illustrated in FIG. 1, configuring downlink bursts collectively shifts a reception timing of an uplink burst from a predetermined reception timing, and thereby prevents the collision with the downlink burst. In this way, since the need is eliminated of providing a downlink burst with a guard time, the rate of the guard time to the communication frame is decreased to improve the transmission efficiency.

In the mobile communication field, since the quality of received signals significantly deteriorates due to fading, the diversity processing is used to reduce the deterioration in the quality of received signals due to fading. The diversity processing is a technique of preventing drops in power of received signals on a receiver side, but in order for a communication terminal apparatus such as a mobile station to implement the diversity, there are limitations in processing capability, miniaturization, etc. Therefore, transmission diversity has been studied in order for a transmitter side to implement the diversity which is originally to be implemented on a receiver side.

The transmission diversity will be described which is performed between a base station and terminal station when the base station communicates with the terminal station using communication frames shown in FIG. 1. It is assumed that each of the base station and terminal station has an IFFT circuit, and performs OFDM communications over both the uplink and downlink.

The base station receives uplink bursts using a plurality of antenna elements, and detects received levels for each antenna element. The detection of received levels is performed for each subcarrier of a received signal. Based on a result of detection of received levels, the base station assigns a subcarrier composing a downlink burst to an antenna element with the highest received level with respect to the subcarrier.

Such transmission diversity has a premise that in the TDD system, propagation path characteristics are approximately the same over the downlink and the uplink. Based on this premise, in the transmission diversity, a downlink signal is transmitted from a branch with the highest uplink received power, whereby it is aimed to maximize the downlink received power in a terminal station.

However, in the frame configuration where downlink slots and uplink slots are respectively collected and arranged, since an uplink slot is spaced apart from a downlink slot (in other words, a large time interval exists between reception of an uplink slot and transmission of a downlink slot), the channel condition at the time of receiving the uplink slot is greatly different from the channel condition at the time of receiving the downlink slot. Accordingly, the premise that propagation path characteristics are approximately the same over the downlink and the uplink crumbles, and there arises a problem that the capability of diversity of improving the received quality deteriorates.

DISCLOSURE OF INVENTION

It is an object of the present invention to provide a base station apparatus and radio communication method enabling enhanced effects of improving received quality due to transmission diversity without degrading the transmission efficiency.

BEST MODE FOR CARRYING OUT THE INVENTION

Figure 1:
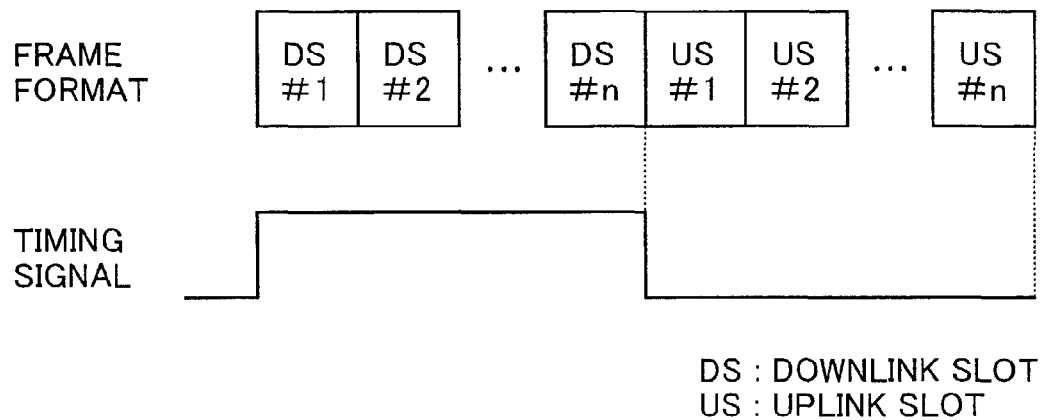
FIG. 1 is an example of a configuration of a communication frame used in OFDM communications.
Figure 2:
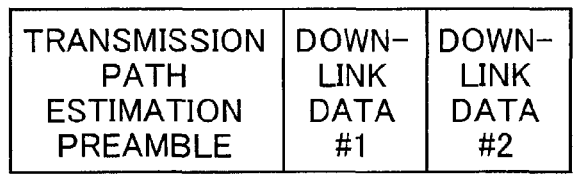
FIG. 2 is a diagram illustrating a structure of a downlink burst.
Figure 3:
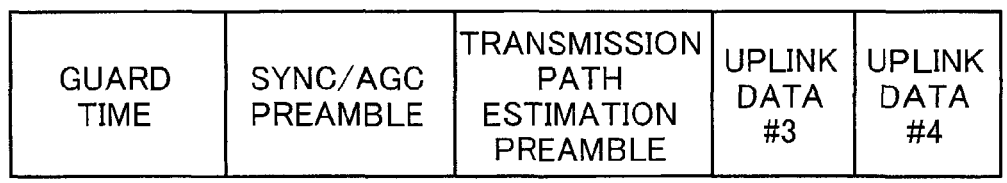
FIG. 3 is a diagram illustrating a structure of an uplink burst.

The inventor of the present invention found out that with attention focused on a slot configuration of a communication frame (see FIG. 1) in a TDD system in which downlink slots and uplink slots are configured collectively, configuring an uplink slot and downlink slot adjacent to one another (i.e., decreasing an open-loop period) improves effects of improving communication quality due to transmission diversity on bursts assigned to the slots configured adjacent to one another. Further, the inventor of the present invention found out that by setting a ratio of a second region to the entire frame properly, an uplink burst and downlink burst are configured adjacent to one another, and it is thereby possible to suppress the deterioration of transmission efficiency caused by a guard time needed to be added to a downlink burst to a range of not affecting the transmission efficiency required in a system.

In other words, it is a gist of the present invention to provide a communication frame with a second region with a short open-loop period, and perform diversity combining on transmission signals assigned to slots of the second region to transmit.

Embodiments of the present invention will be specifically described below with reference to accompanying drawings.

First Embodiment

Figure 4:
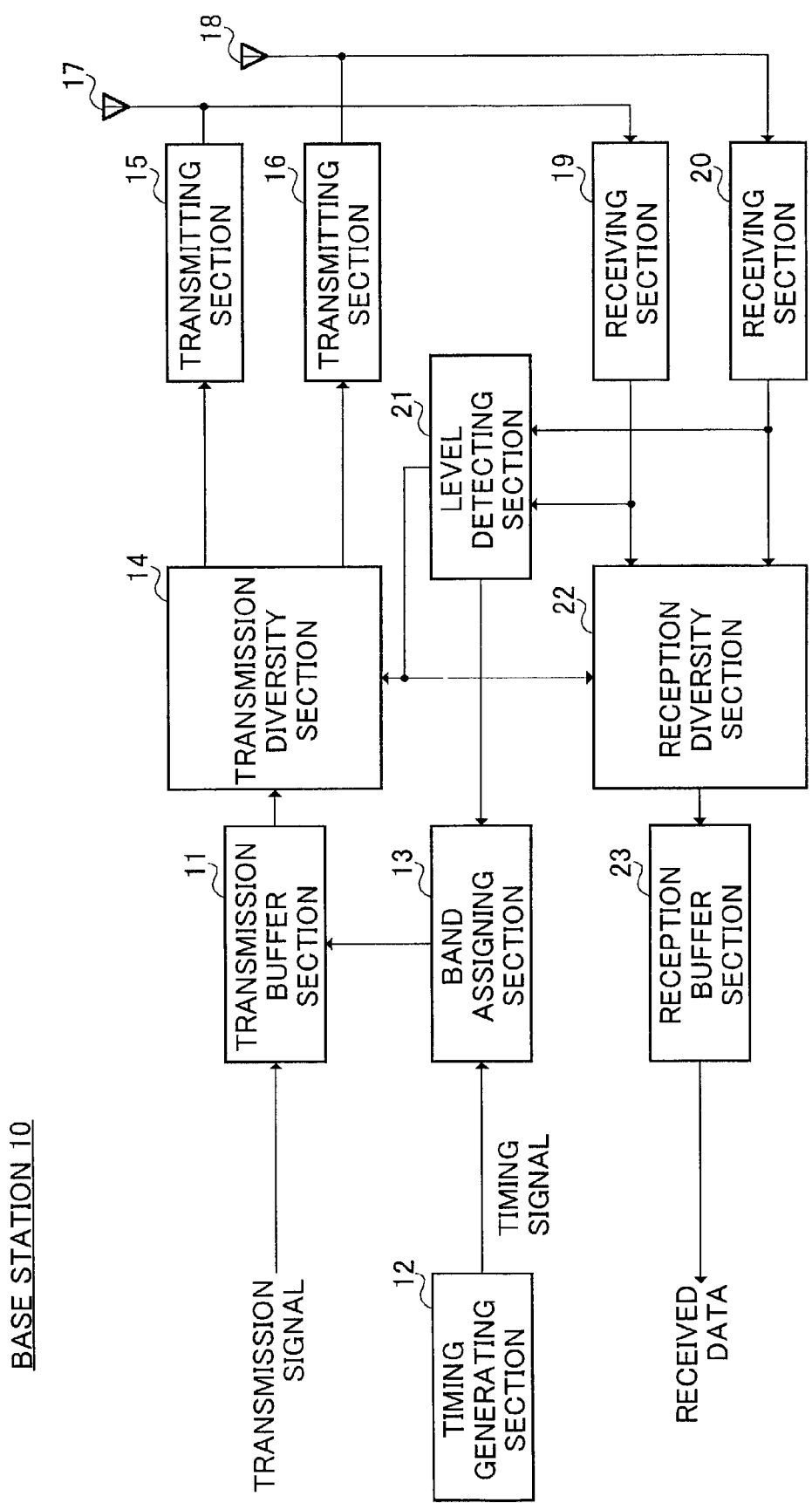
FIG. 4 is a block diagram illustrating a configuration of a base station according to a first embodiment of the present invention.

FIG. 4 is a block diagram illustrating a configuration of base station 10 according to the first embodiment of the present invention. In this embodiment it is assumed that base station 10 performs radio communications with terminal stations #1 to #n not shown. It is further assumed that base station 10 performs bi-directional communications with terminal stations #1 to #n using the TDD system. A case is explained as an example where each of base station 10 and terminal stations #1 to #n is provided with an OFDM modulator and OFDM demodulator (either is not shown), and OFDM communications are performed over the uplink and downlink.

In FIG. 4 receiving section 19 performs predetermined reception processing such as downconverting and A/D conversion on a received signal received from corresponding antenna element 17. Receiving section 20 performs predetermined reception processing such as downconverting and A/D conversion on a received signal received from corresponding antenna element 18. In addition, the received signals received from antenna elements 17 and 18 are OFDM signals transmitted from either of terminal stations #1 to #n.

Based on output signals from receiving sections 19 and 20, level detecting section 21 detects a received level of each subcarrier composing the received OFDM signal for each antenna. In other words, level detecting section 21 detects received levels of subcarriers composing the OFDM signal received from antenna 17 based on the output signal from receiving section 19, while detecting received levels of subcarriers composing the OFDM signal received from antenna 18 based on the output signal from receiving section 20.

Reception diversity section 22 refers to received levels detected in level detecting section 21, and performs diversity combining on received signals output from receiving sections 19 and 20. Specifically, reception diversity section 22 refers to a result detected in level detecting section 21, and performs selective combining of selecting a subcarrier with a higher level as a received signal.

In addition, diversity combining in reception diversity section 22 is not limited to the selective combining. For example, reception diversity section 22 may shift phases of signals output from receiving sections 19 and 20 to be in phase for each subcarrier, perform weighting on the in-phase received signals based on respective received levels, and perform maximal-ratio combining on the weighted signals. Further, reception diversity section 22 may shift phases of signals output from receiving sections 19 and 20 to be in phase for each subcarrier, and perform equal-gain combining on the in-phase received signals.

The received signals subjected to the diversity combining in reception diversity section 22 are output to reception buffer section 23. Reception buffer section 23 performs processing such as FFT (Fast Fourier Transform) on the output signal of reception diversity section 22 to obtain received data. Reception buffer section 23 further performs error detection on the received data, and outputs received data with no error detected therein as final received data to following circuitry.

Base station 10 has sections for reception as configured described above. A configuration of sections for transmission will be described below.

Transmission buffer section 11 performs IFFT (Inverse Fast Fourier Transform) on transmission data to generate an OFDM signal, and holds the signal until the time of receiving control to output from band assigning section 13.

Timing generating section 12 generates a rectangle timing signal with rising edges and falling edges, and outputs the generated timing signal to band assigning section 13. The timing signal is generated based on a slot configuration of a communication frame predetermined under the system.

Band assigning section 13 refers to the timing signal output from timing generating section 12 (particularly, by detecting the rising edge and falling edge), and recognizes the slot configuration in the communication slot. Then, based on the result of detection of received levels in level detecting section 21, band assigning section 13 assigns an uplink slot and downlink slot configured at predetermined positions in the communication frame to each of terminal stations #1 to #n. Band assigning section 13 controls transmission buffer section 11 according to the slot assignment, and instructs the section 11 to output the OFDM signal held in the section 11 to transmission diversity section 14 as a downlink burst.

Based on the result of detection of received levels in level detecting section 21, transmission diversity section 14 performs transmission diversity processing on the downlink burst output from transmission buffer section 11. In other words, transmission diversity section 14 selects an antenna element with a higher received level for each subcarrier, and outputs a signal assigned to the subcarrier to a transmitting section (transmitting section 15 or 16) corresponding to the selected antenna. For example, with respect to subcarrier S1 with predetermined frequency f1 of OFDM signals output from antenna elements 17 and 18, when the received level of the received signal from antenna element 17 is higher that from antenna element 18, transmission diversity section 14 outputs subcarrier S1 with f1 among OFDM signals output from transmission buffer section 11 to transmitting section 15 corresponding to antenna element 17 to transmit from antenna element 17.

Thus, in the OFDM signals, since propagation path characteristics are different for each subcarrier, base station 10 according to this embodiment performs the transmission diversity for each subcarrier.

Transmitting sections 15 and 16 perform predetermined radio transmission processing such as upconverting and D/A conversion on output signals from transmission diversity section 14. The signals thus having undergone radio transmission processing are transmitted from antenna element 17 or 18.

While base station 10 according to this embodiment is provided with two antenna elements, i.e., antenna elements 17 and 18, to perform diversity processing, the present invention allows base station 10 to have a plurality of antenna elements to perform diversity.

Figure 5:
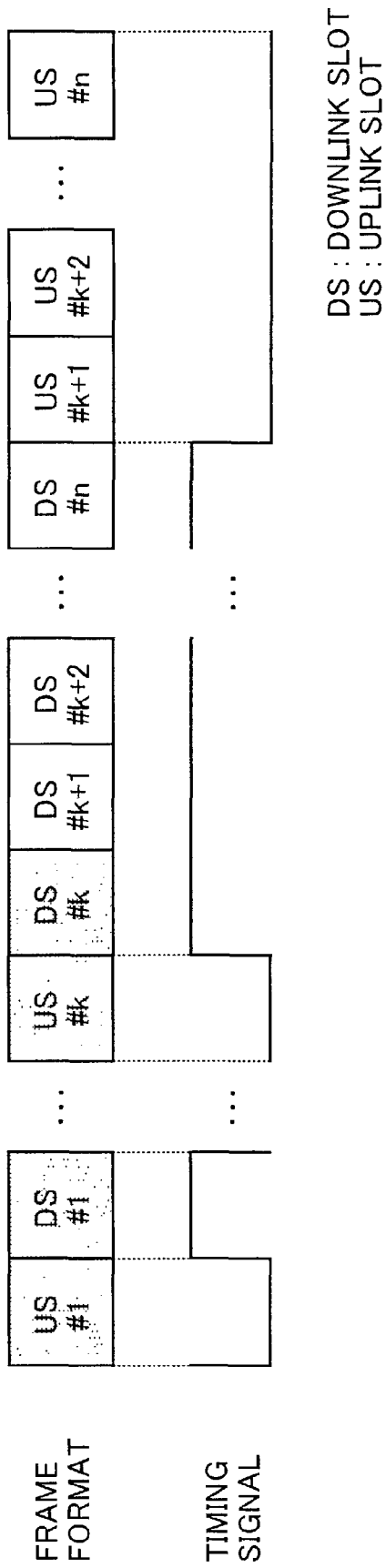
FIG. 5 is a diagram to explain an example of a slot configuration of a communication frame used in the first embodiment of the present invention.

FIG. 5 is a diagram to explain an example of a slot configuration of a communication frame used in the first embodiment of the present invention. As illustrated in FIG. 5, in this embodiment, a general communication frame in which downlink slots and uplink slots are collectively configured is provided with an interval at which uplink slots and downlink slots are configured so that uplink and downlink slots are adjacent to each other. Hereinafter, in the specification, the interval in a communication frame at which uplink and downlink slots are configured adjacent to each other is referred to as a "second region". Further, in the communication frame, the other region except the second region is referred to as a "first region". In an example shown in FIG. 5, the second region is composed of uplink slots #1 to #k and downlink slots #1 to #k, while the first region is composed of uplink slots #k+1 to #n and downlink slots #k+1 to #n.

FIG. 5 shows, as an example of configuring uplink and downlink slots adjacent to each other, a case where an uplink slot is configured immediately after a downlink slot. In other words, in the second region of the communication slot shown in FIG. 5, an uplink slot for a terminal station and a downlink slot for the terminal station are configured as a pair of unit.

The operation of base station 10 with the above configuration will be described below.

The operation of sections for reception in base station 10 will be described first.

OFDM signals transmitted from terminal stations #1 to #n are received in antenna elements 17 and 18. The OFDM signals received in antenna elements 17 and 18 are subjected to predetermined radio reception processing respectively in receiving sections 19 and 20, and output to level detecting section 21 and reception diversity section 22.

Level detecting section 21 detects received levels for each subcarrier composing a received OFDM signal. Results of the detection of received levels for each subcarrier are output to reception diversity section 22, transmission diversity section 14 and band assigning section 13. Reception diversity section 22 refers to input received levels, and performs diversity combining for each subcarrier. Reception buffer section 23 performs FFT on the resultant of diversity combining to obtain received data.

Next, the operation of sections for transmission in base station 10 will be described next.

Timing generating section 12 generates a rectangle timing signal composed of rising edges and falling edges, according to the slot configuration as shown in FIG. 5. The timing signal is generated, for example, as shown in FIG. 5, so that each rising edge indicates a switching timing from an uplink slot to a downlink slot, while each falling edge indicates a switching timing from a downlink slot to an uplink slot.

Band assigning section 13 assigns downlink bursts (downlink burst 1 to n) respectively for terminal stations #1 to #n to slots in the communication frame, corresponding to the result of the detection of received levels in level detecting section 21. The configuration of slots is set in advance under the system, and for example, the slots are configured as shown in FIG. 5.

The slot assignment for downlink burst is performed in consideration of effects on communication quality caused by difference in configuration method between slots configured in the second region and slots configured in the other region except the second region, and particularly, in consideration of effects on communication quality of the downlink channel in controlling the downlink channel based on channel conditions (for example, received levels) on the uplink channel, (i.e., performing open-loop control). In the open-loop control, predetermined processing is performed on a downlink transmission signal based on an estimation result of the uplink channel condition. For example, in transmission diversity processing that is an example of open-loop control, as described above, downlink bursts are subjected to diversity combining based on received levels of uplink slots.

In other words, in the second region, since a downlink slot is configured immediately after an uplink slot, a time (in the specification, also referred to as an "open-loop period") elapsed between reception of an uplink slot and transmission of a downlink slot corresponding to the received uplink slot (in other words, a downlink slot on the same channel as of the received uplink slot) is shorter than an open-loop period in the first region. Accordingly, in performing open-loop control, assigning a slot in the second region allows higher accuracy in performing predetermined processing (for example, diversity combining) on a downlink transmission signal than assigning a slot in the first region.

Thus, by performing open-loop control using a slot configured in the second region, it is possible to use channel estimation results with higher accuracy than performing communications using a slot assigned to the first region. It is thus possible to control signals to transmit over the downlink appropriately. For example, when the transmission diversity is performed, the diversity effect can be improved.

Accordingly, band assigning section 13 refers to received levels detected in level detecting section 21, and assigns the second region preferentially to a terminal station of low received level (i.e., poor channel condition), whereby it is possible to improve the communication quality of the terminal station in poor channel condition.

Meanwhile, in order to assign slots to the second region, since uplink and downlink slots are adjacent to each other, the need arises of providing a downlink slot with a guard time. Accordingly, an increased ratio of the second region to the communication frame may cause the transmission efficiency to deteriorate. Therefore, the number of slots (the number of channels) configured in the second region is determined corresponding to the transmission efficiency. For example, when it is assumed that a frame length is 2 ms, a guard time is 4 µs, and slots corresponding to five channels (in other words, five slots for each of uplink and downlink channels, i.e., total 10 slots) are configured in the second region, an increase in guard time is 5×µ4 s=20 µs, which is one-thousandth of the frame length, 2 ms. Thus, it is possible to suppress the deterioration in transmission efficiency in the entire frame caused by providing the second region to an extremely small extent.

Band assigning section 13 controls transmission buffer section 11 according to the slot assignment for each terminal as described above. For example, when a communication frame is configured as shown in FIG. 5, the section 13 detects a first rising edge of the timing signal, and performs control for outputting downlink burst #1 at a timing of detecting the rising edge. In this way, a second slot from the beginning (left end viewed in the figure) of a frame is assigned the downlink burst. Subsequently, downlink bursts #2 to #n are output from transmission buffer section 11 at predetermined timings in the same way as in the control of downlink burst #1.

The downlink bursts output from transmission buffer section 11 are subjected to transmission diversity processing in transmission diversity section 14, then to predetermined radio transmission processing in transmitting section 15 or 16, and transmitted from corresponding antenna element 17 or 18.

Figure 6:
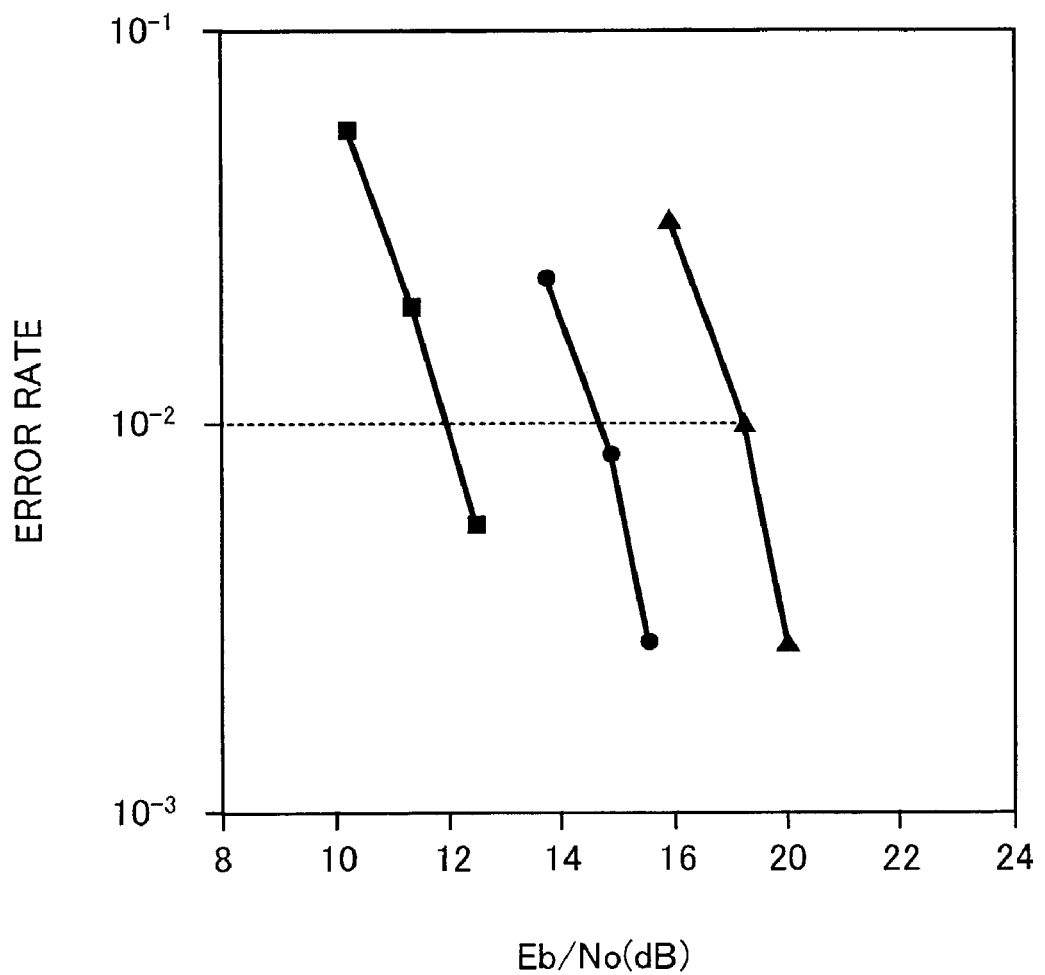
FIG. 6 is a diagram illustrating simulation results of the relationship between Eb/No(dB) and an error rate in a terminal station.

FIG. 6 illustrates simulation results of the relationship between Eb/No(dB) measured in base station 10 as described above and an error rate in a terminal station. Simulation conditions are as described below.

PDU size: 54 BYTES;
FFT sample rate: 20 MHz;
Guard interval length: 800 ns
Frame length: 2 ms;
Modulation scheme: 16 AM;
Error correction: Convolutional coding/Viterbi decoding (where the constraint length is 7 and coding rate is 9/16);
Delay deviation: 150 ns; and
Maximum Doppler frequency: 50 Hz.

In FIG. 6, black squares indicate simulation results of the case of using the present invention (in other words, a communication frame is provided with the second region), black circles indicate simulation results of the case of using a conventional base station (the case of performing transmission diversity), and black triangles indicate simulation results of the case of using a conventional base station (the case of not performing transmission diversity).

Thus, the simulation results of the present invention show great improvements in Eb/No needed to obtain a predetermined error rate, as compared to the simulation results of the case of performing conventional transmission diversity. For example, when the error rate in a terminal station is $10^{-2}$, Eb/No is improved by about 1.5 dB.

As described above, according to this embodiment, a communication frame is provided with a second region having a short open-loop period and transmission signals assigned to slots in the second region are subjected to diversity combining, whereby it is possible to improve the diversity effect with the transmission efficiency hardly degraded.

Second Embodiment

Figure 7:
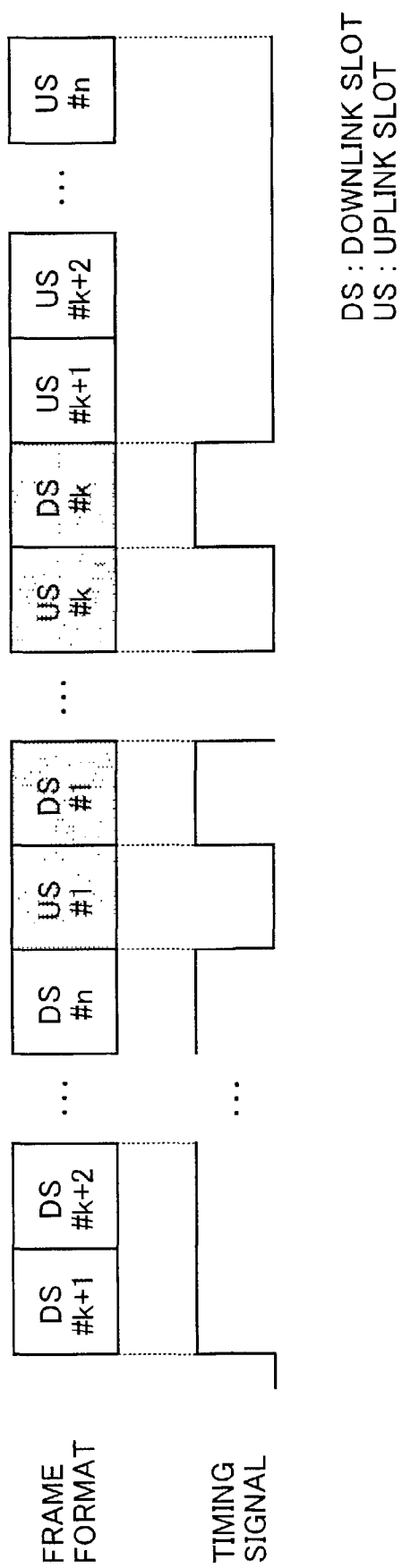
FIG. 7 is a diagram to explain an example of a slot configuration of a communication frame used in a second embodiment of the present invention.

This embodiment is a modification of the first embodiment, and provides a different communication frame configuration from that in the first embodiment. FIG. 7 is a diagram to explain an example of a slot configuration of a communication frame used in the second embodiment of the present invention. As shown in FIG. 7, in the communication frame used in this embodiment, downlink slots except slots assigned to the second region are configured collectively at a beginning portion of the frame, while uplink slots except slots assigned to the second region are configured collectively at an end portion of the frame. The second region is sandwiched between thus collectively configured downlink slots and uplink slots.

Thus, in this embodiment, downlink slots except slots assigned to the second region are configured collectively at a beginning portion of a frame, while uplink slots except slots assigned to the second region are configured collectively at an end portion of the frame. In this way, an interval between the uplink slot and a downlink slot in the next frame is shorter than in the frame configuration shown in FIG. 5. Accordingly, when the channel condition is estimated using an uplink slot of a last frame and based on the estimation result, transmission diversity is performed, it is possible to further enhance the effect of improving the received quality due to diversity, as compared to the case illustrated in the first embodiment.

Third Embodiment

Figure 8:
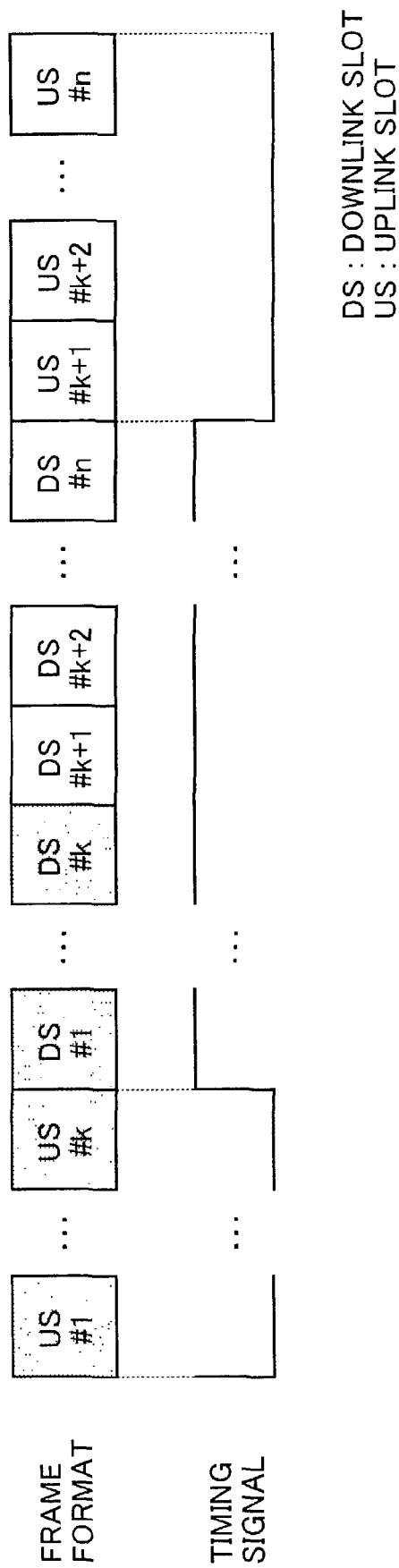
FIG. 8 is a diagram to explain an example of a slot configuration of a communication frame used in a third embodiment of the present invention.

This embodiment is a modification of the first embodiment, and provides a different slot configuration in the second region from that in the first embodiment. FIG. 8 is a diagram to explain an example of the slot configuration of a communication frame used in the third embodiment of the present invention. As shown in FIG. 8, in the second region of the communication frame used in this embodiment, among slots configured in the second region, uplink slots are collectively configured at the first half of the second region, while downlink slots are collectively configured at the latter half of the second region.

The number of slots configured in the second region is predetermined in advance under the system so that a time interval between an uplink slot in the second region and a downlink slot corresponding to the uplink slot is shorter than a time interval between an uplink slot out of the second region and a downlink slot corresponding to the uplink slot. It is preferable to set the number of slots configured in the second region so as to sufficiently obtain the effect of improving the communication quality in a terminal station due to the transmission diversity. For example, when a burst length is 24 µs, assuming five uplink slots and five downlink slots are configured in the second region results in the time interval of 120 µs between an uplink slot in the second region and a downlink slot corresponding to the uplink slot. 120 µs is 1/20 of the frame length (2 ms), and is adequately short to obtain the effect of improving the received quality due to the transmission diversity.

Thus, in this embodiment, since uplink slots and downlink slots are configured separately and collectively in the second region, it is possible to decrease the number of switching processing times between the transmission and reception processing in a predetermined time as compared to the first embodiment. Further, it is possible to perform the switching processing at a lower rate than in the first embodiment. It is thereby possible to reduce the power consumption required for the switching processing between the transmission and reception processing and to miniaturize an apparatus.

In the first and second embodiments, all the downlink bursts contained in the second region need to be provided with a guard time. In this embodiment, providing only a downlink burst at the beginning of the second region with a guard time is capable of preventing the collision of bursts. Therefore, by using the communication frame in this embodiment, it is possible to further prevent decreases in the transmission efficiency as compared to cases illustrated in the first and second embodiments.

Fourth Embodiment

Figure 9:
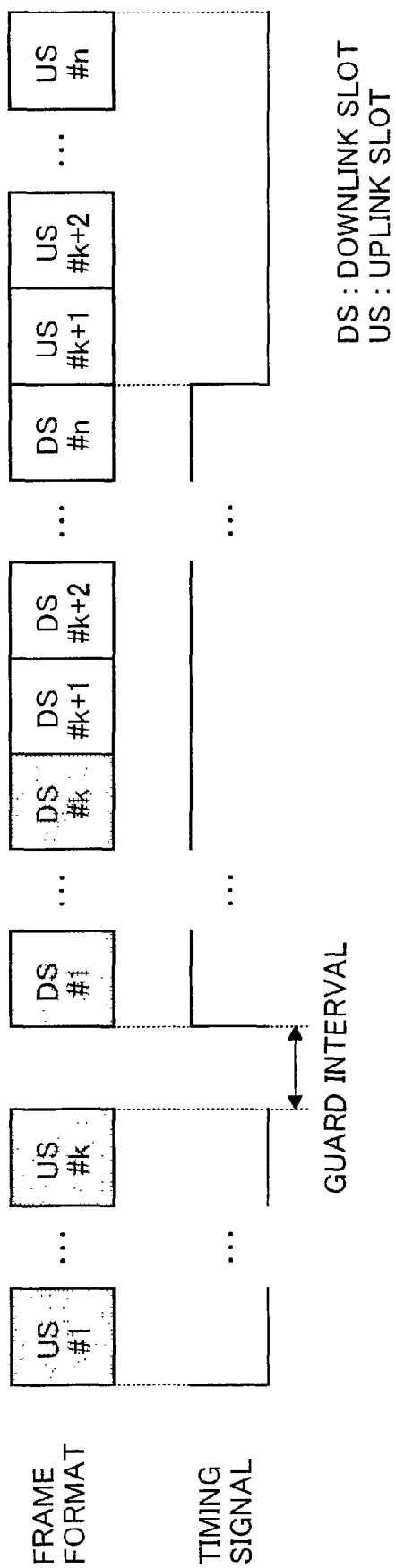
FIG. 9 is a diagram to explain an example of a slot configuration of a communication frame used in a fourth embodiment of the present invention.

This embodiment is a modification of the third embodiment, provides a guard interval between an interval at which uplink slots are collectively configured in the second region and an interval at which downlink slots are collectively configured in the second region, and in this respect, is different from the third embodiment. FIG. 9 is a diagram to explain an example of a slot configuration of a communication frame used in the fourth embodiment of the present invention. As illustrated in FIG. 9, in the second region of the communication frame used in this embodiment, as in the third embodiment, among slots configured in the second region, uplink slots are collectively configured at the first half of the second region, while downlink slots are collectively configured at the latter half of the second region. A guard interval to which any burst for transmitting information is not assigned is provided between the first half of the second region in which uplink slots are collectively configured and the latter half of the second region in which downlink slots are collectively configured.

Thus, in this embodiment, by providing a guard interval between the first half of the second region in which uplink slots are collectively configured and the latter half of the second region in which downlink slots are collectively configured, it is possible to perform the switching processing between the transmission and reception processing at a lower rate than in the third embodiment. It is thereby possible to further reduce the power consumption required for the switching processing between the transmission and reception processing and to miniaturize an apparatus.

Fifth Embodiment

Figure 10:
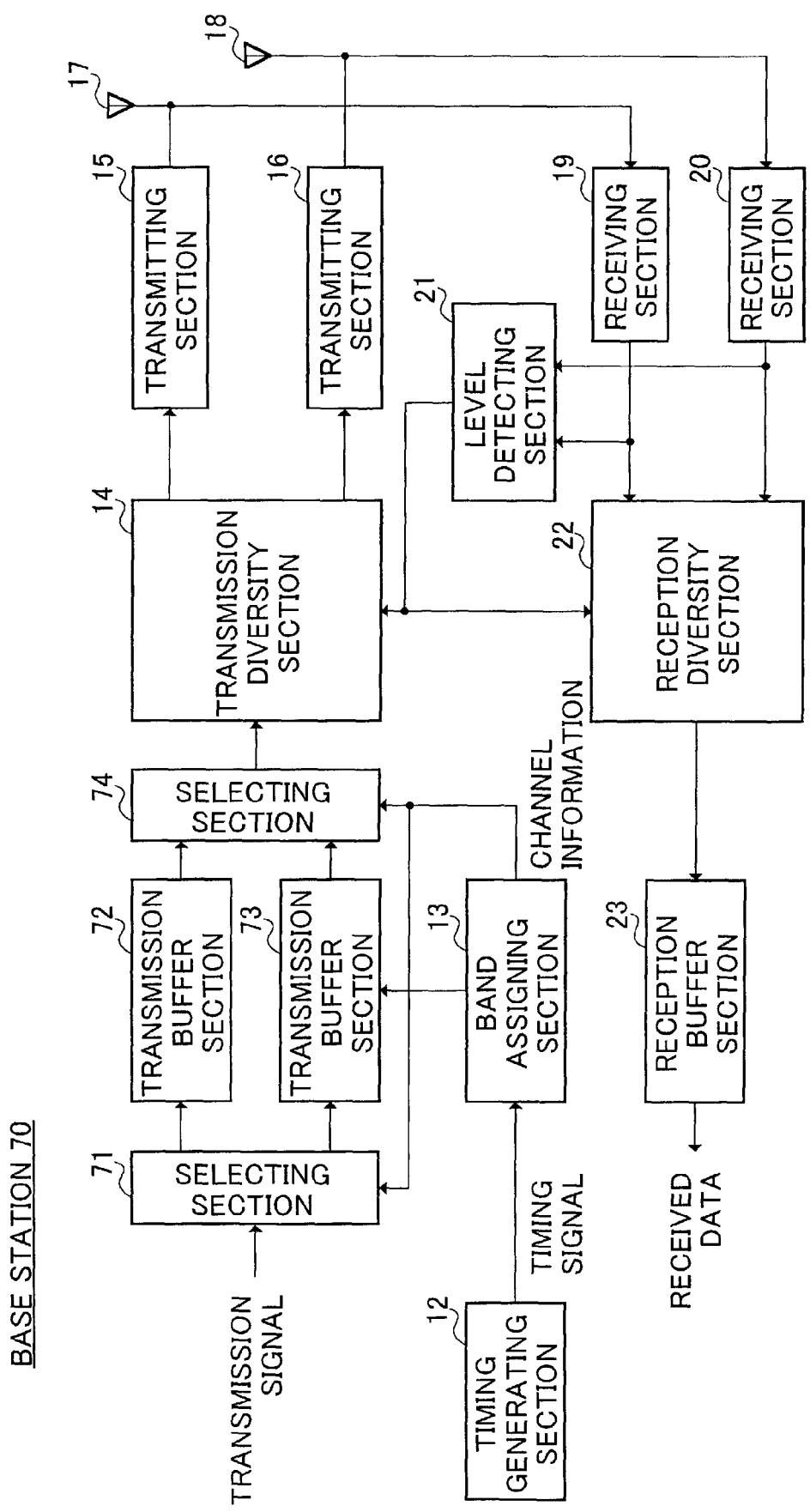
FIG. 10 is a block diagram illustrating a configuration of a base station according to a fifth embodiment of the present invention.

This embodiment is a modification of the first embodiment, and it is a feature of this embodiment to preferentially assign a signal with a high priority such as a control signal and repeat signal to the second region. FIG. 10 is a block diagram illustrating a configuration of base station 70 according to the fifth embodiment of the present invention. In addition, in FIG. 10, the same structural elements as in FIG. 4 are assigned the same reference numerals to omit detailed descriptions thereof. Further, a communication frame used in this embodiment is the same as that illustrated in FIG. 5.

The signal with a high priority is such a signal that requires a high error rate, and for example, includes a control signal and repeat signal. The signal(s) with a high priority is defined under the system in advance, and band assigning section 13 obtains information on the signal with a high priority as channel information.

In FIG. 10, selecting section 71 refers to the channel information held in band assigning section 13, selects the signal with a high priority from transmission signals, and outputs the selected signal to transmission buffer section 72. Selecting section 71 further outputs signals except the signal with a high priority to transmission buffer section 73.

Selecting section 74 refers to the channel information, reads the signal with a high priority from transmission buffer section 72, and assigns the signal to a slot configured in the second slot of the communication frame illustrated in FIG. 5.

Band assigning section 13 assigns signals except the signal with a high priority to slots configured at the region except the second region. Band assigning section 13 controls transmission buffer section 73 according to the slot assignment, so that the transmission buffer section 73 outputs signals stored therein to transmission diversity section 14 through selecting section 74.

In this way, according to this embodiment, a signal with a high priority (i.e., signal requiring a high error rate) is preferentially assigned to a slot configured in the second region. Since the signal assigned to a slot configured in the second region takes an advantage of higher effect of improving the communication quality due to the diversity, and it is possible to improve the error rate of the signal with a high priority.

Sixth Embodiment

Figure 11:
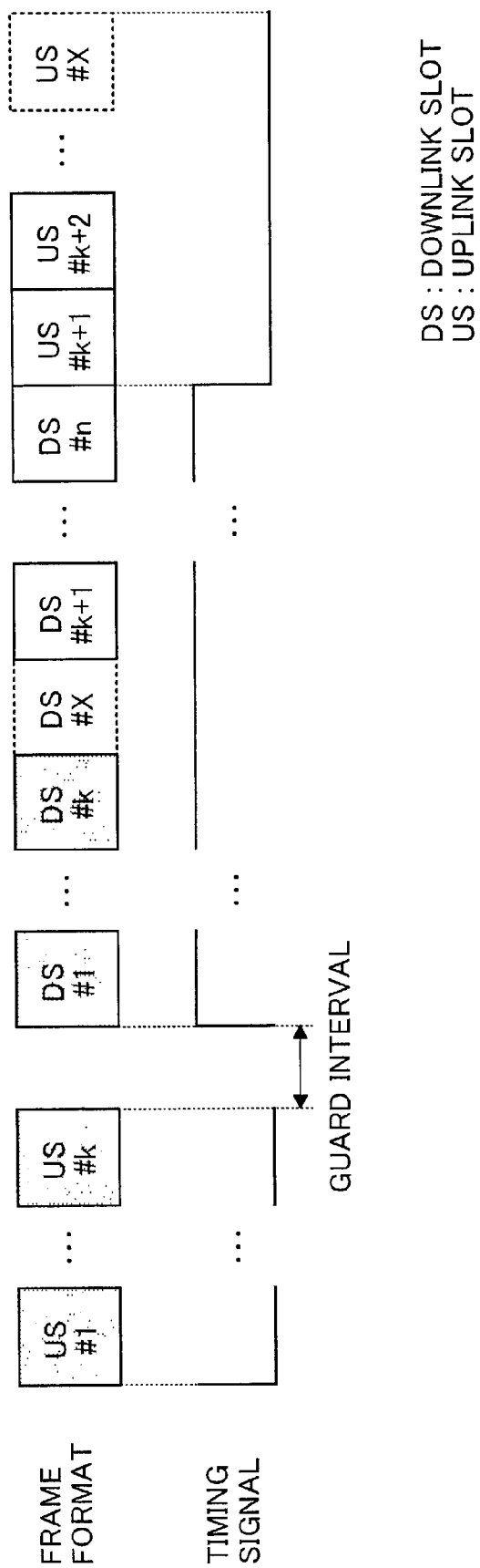
FIG. 11 is a diagram to explain an example of a slot configuration of a communication frame used in a sixth embodiment of the present invention.

This embodiment is a modification of the fourth embodiment, and provides a different communication frame configuration from that in the forth embodiment. FIG. 11 is a diagram to explain an example of a slot configuration of a communication frame used in the sixth embodiment of the present invention.

As illustrated in FIG. 11, in the communication frame used in this embodiment, a slot next to the second region (i.e., a first one of the downlink slots collectively configured at the region except the second region) is defined as downlink slot X, while a last slot of the communication frame (i.e., a last one of the uplink slots collectively configured at the region except the second region) is defined as uplink slot X. The uplink slot X configured in such a position is assigned burst X, and the downlink slot X configured in such a position is assigned burst X. In addition, the uplink slot X corresponds to a target uplink slot as described in the claims, while the downlink slot X corresponds to a target downlink slot as described in the claims.

Bursts assigned to the downlink and uplink slots X are selected based on channel quality information such as RSSI and CRC detection result in band assigning section 13. For example, based on the channel quality information, band assigning section 13 selects a burst in the poorest channel condition from among bursts that cannot be assigned to the second region.

According to the slot configuration as described above, an interval between the uplink slot X and the downlink slot X of the next frame is shorter than an interval between an uplink slot assigned to the region except the second region and a downlink slot in the next frame corresponding to the uplink slot (for example, an interval between uplink slot k+1 and downlink slot k+1 in the next frame). Accordingly, the channel condition is estimated using uplink slot X of a last frame and based on the estimation result, the transmission diversity is performed, whereby using a slot (herein, slot X) configured in the first region also enhances the effect of improving the communication quality due to the diversity.

Seventh Embodiment

Figure 12:
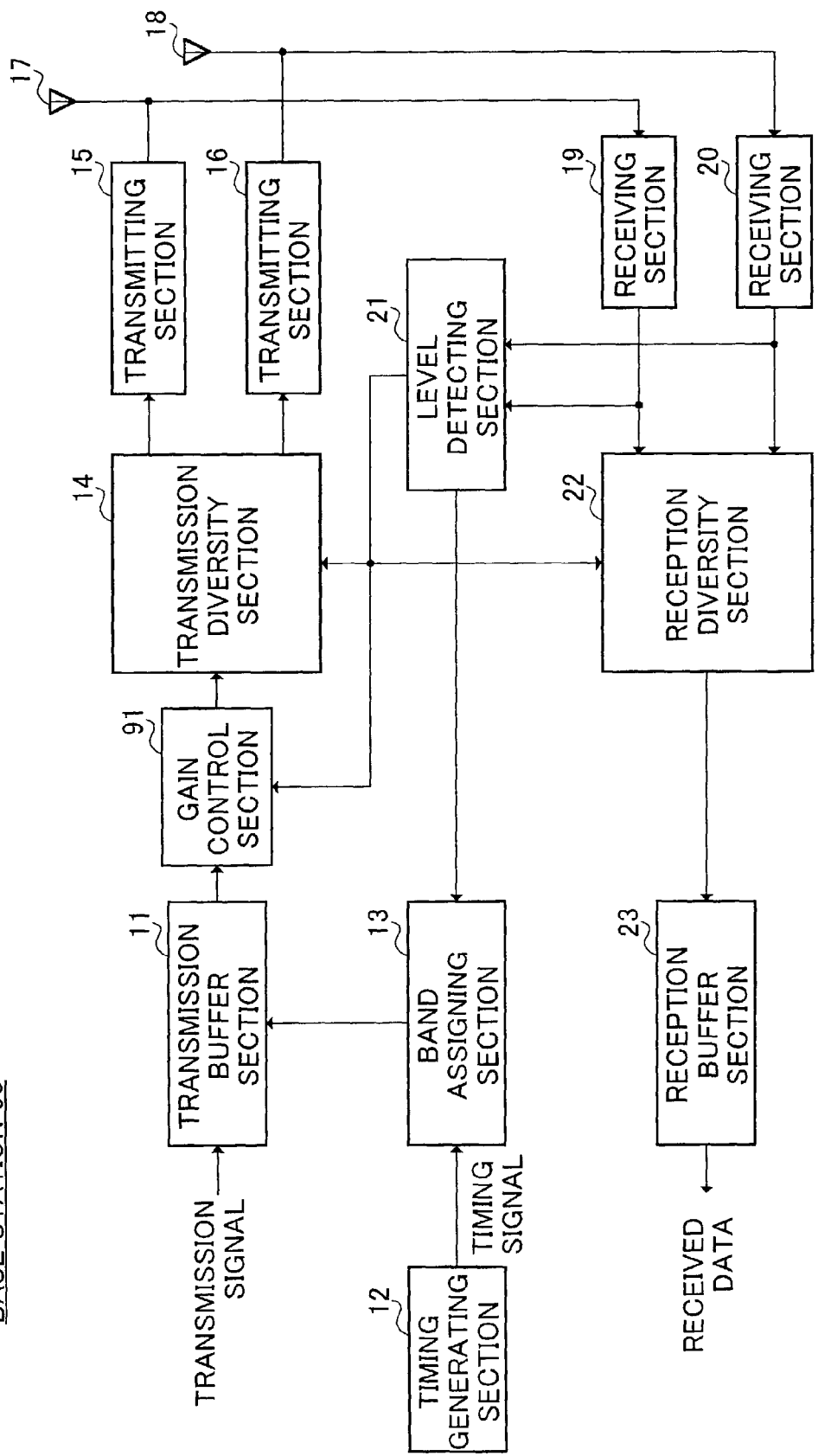
FIG. 12 is a block diagram illustrating a configuration of a base station according to a seventh embodiment of the present invention.

This embodiment is a modification of the first embodiment, and it is a feature of this embodiment that base station 90 performs transmission gain control in addition to the transmission diversity. FIG. 12 is a block diagram illustrating a configuration of base station 90 according to the seventh embodiment of the present invention. In addition, in FIG. 12, the same structural elements as in FIG. 4 are assigned the same reference numerals to omit detailed descriptions thereof. Further, a communication frame used in this embodiment is the same as that illustrated in FIG. 5.

In FIG. 12, gain control section 91 calculates transmission power based on the result in detection of received levels of uplink slots in level detecting section 21, and amplifies a downlink burst output from transmission buffer section 11 to the calculated transmission power. Specifically, gain control section 91 compares a received level (hereinafter referred to as a "detection level") detected in level detecting section 21 with a received level (hereinafter referred to as a "target level") indicative of a predetermined target level. When the detection level is higher than the target level, the section 91 decreases the transmission power. On the other hand, when the detection level is lower than the target level, the section 91 increases the transmission power.

Gain control section 91 performs transmission power control for each subcarrier. In other words, the target level is determined for each subcarrier, and by comparing the target level with the detection level detected for each subcarrier, the transmission power control is performed for each subcarrier.

Figure 13:
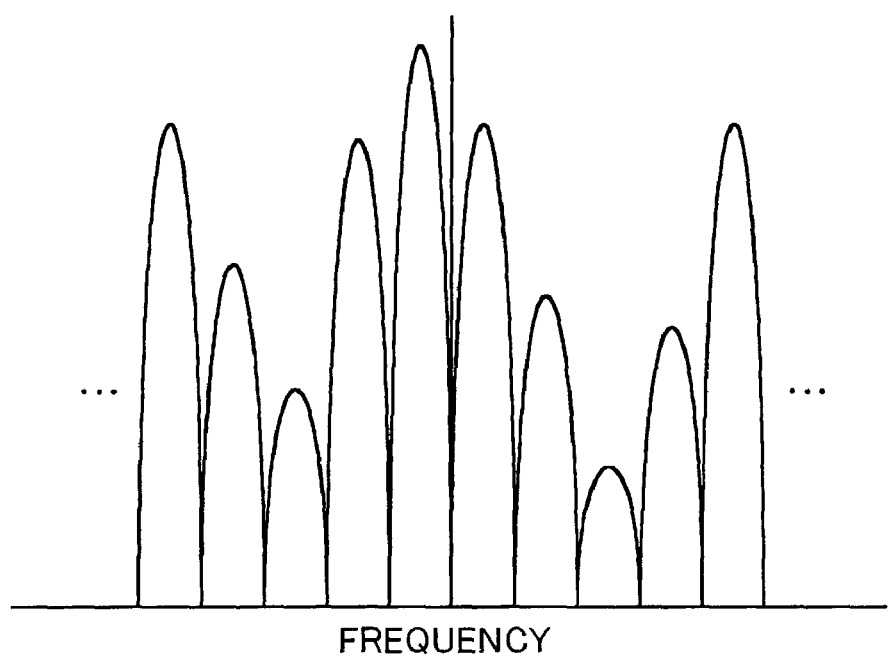
FIG. 13 is a diagram illustrating transmission power of a downlink burst for each subcarrier.

The transmission power control for each subcarrier will be described with reference to FIGS. 13 and 14. FIG. 13 is a diagram illustrating transmission power of a downlink burst for each subcarrier, and FIG. 14 is a diagram illustrating received power of the downlink burst illustrated in FIG. 13 in a terminal station.

The downlink burst illustrated in FIG. 13 has been amplified in gain control section 91 illustrated in FIG. 12. As illustrated in FIG. 13, subcarriers in good channel conditions (for example, third and eighth subcarriers from the left viewed in the figure) are transmitted with low transmission power, while subcarriers in poor channel conditions (for example, first and fifth subcarriers from the left viewed in the figure) are transmitted with high transmission power.

Figure 14:
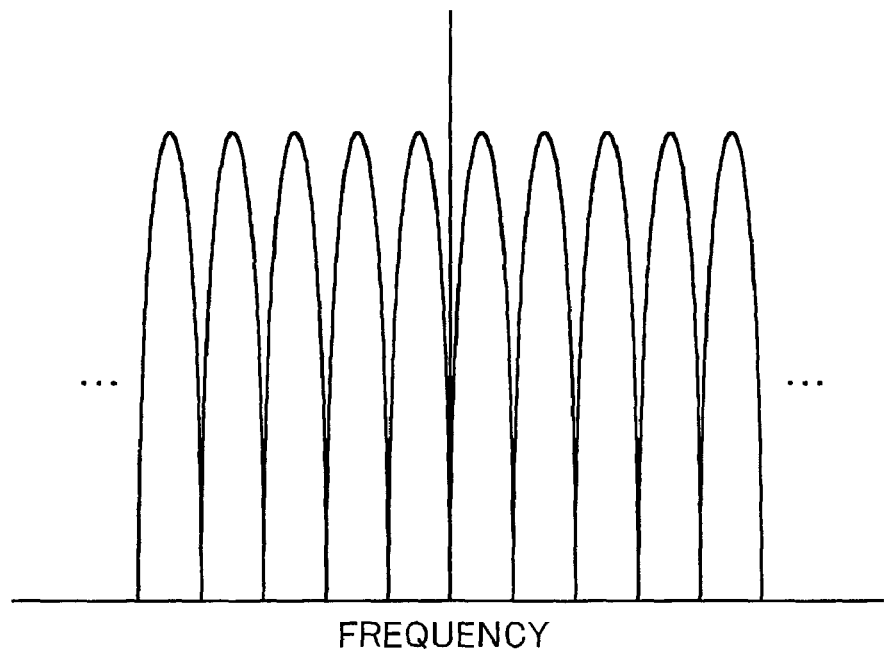
FIG. 14 is a diagram illustrating received power of the downlink burst in a terminal station.

The downlink burst transmitted in this way is received in a terminal station as illustrated in FIG. 14. As illustrated in FIG. 14, each subcarrier is attenuated on the transmission path, and is received with approximately the same power as one another.

By thus performing the transmission power control for each subcarrier, it is possible to hold the received power of subcarriers at approximately the same level. A subcarrier with a falling received level is considered as a dominant factor that degrades the error rate of an OFDM signal. Therefore, holding the received power of subcarriers at approximately the same level prevents the received level from falling down. It is thereby possible to improve the error rate performance.

Eighth Embodiment

Figure 15:
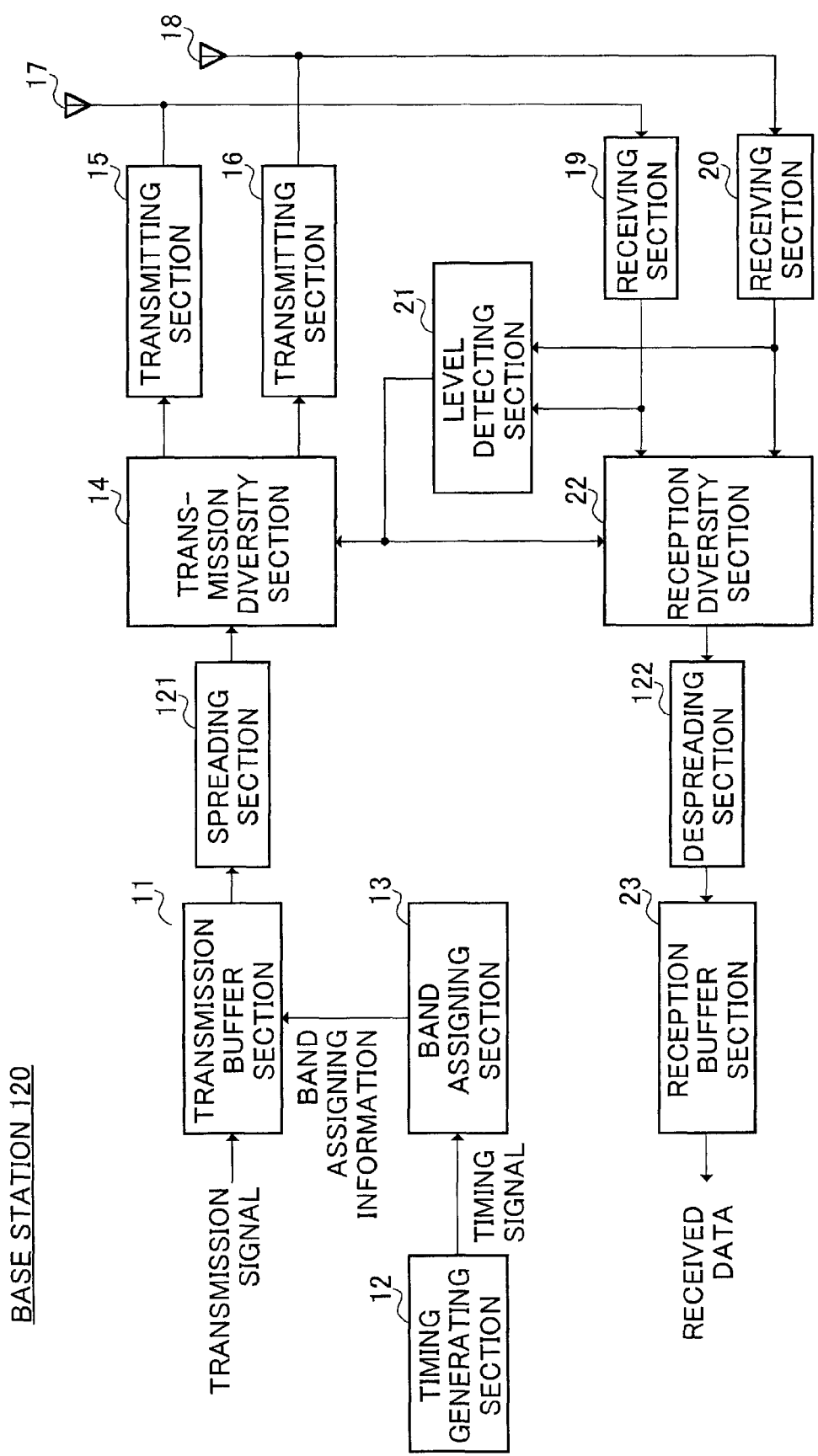
FIG. 15 is a block diagram illustrating a configuration of a base station according to an eighth embodiment of the present invention.

This embodiment is a modification of the first embodiment, and it is a feature of this embodiment that base station 120 performs communications according to an OFDM-CDMA (Code Division Multiple Access) system. FIG. 15 is a block diagram illustrating a configuration of base station 120 according to the eighth embodiment of the present invention. In addition, in FIG. 15, the same structural elements as in FIG. 4 are assigned the same reference numerals to omit detailed descriptions thereof. Further, a communication frame used in this embodiment is the same as that illustrated in FIG. 5. The OFDM-CDMA system is to perform CDMA communications in multicarrier, and has a feature of multiplexing chips assigned subcarriers, and thereby performing the frequency division multiplexing.

In FIG. 15, spreading section 121 performs spreading on a transmission signal output from transmission buffer section 11, and thereby assigns each of subcarriers composing the transmission signal to spreading chips. The transmission signal with each subcarrier assigned the chips is subjected to diversity combining in transmission diversity section 14, and the resultant radio signal is transmitted from corresponding antenna element 17 or 18 through transmitting section 15 or 16, respectively.

In this way, according to this embodiment, since the diversity effect is improved on slots configured in the second region, it is thereby possible to decrease deterioration in the orthogonality between spreading codes. As a result, since the number of spreading chips usable in the frequency division multiplexing increases, it is possible to improve the transmission efficiency.

As described above, according to this embodiment, a communication frame is provided with a second region having a short open-loop period, and transmission signals assigned to slots in the second region are subjected to the diversity combining, whereby it is possible to improve the diversity effect while hardly degrading the transmission efficiency.

This application is based on the Japanese Patent Application No. 2001-121542 filed on Apr. 19, 2001, entire content of which is expressly incorporated by reference herein.

INDUSTRIAL APPLICABILITY

The present invention is suitable for use in a base station apparatus that performs bi-directional radio communications with terminal stations using a TDD (Time Division Duplex) system in which time slots with the same radio frequency are used to communicate alternately over the uplink and downlink, and more particularly, for use in a base station apparatus that performs communications using an OFDM (Orthogonal Frequency Division Multiplexing) system.

The invention claimed is:

1. A base station apparatus comprising:
a timing generating section that generates a timing for assigning an uplink slot and a timing for assigning a downlink slot to a communication frame having time slots for communicating a transmission signal; and
a band assigning section that provides in the communication frame, in accordance with said timings generated by said timing generating section, both (i) a first region in which the downlink slot is assigned to the beginning of the frame after a plurality of downlink slots are collectively assigned, uplink slots are collectively assigned, and (ii) a second region in which the uplink slot is assigned to the beginning of the second region and the downlink slot are alternately assigned,
wherein the band assigning section arranges the second region between the downlink slot and the uplink slot contained in the first region.

2. The base station apparatus according to claim 1, comprising:

a section that detects a received level of an uplink slot configured in the second region; and a diversity section that performs diversity transmission on a downlink transmission signal assigned to a downlink slot corresponding to the uplink slot, corresponding to a result of detection of the received level.

3. The base station apparatus according to claim 1, further comprising:

a section that assigns a transmission signal with a high priority to a downlink slot contained in the second region; and a diversity section that performs diversity transmission on the transmission signal with a high priority, corresponding to a result of detection of a received level of an uplink slot corresponding to the downlink slot assigned the transmission signal with high priority.

4. The base station apparatus according to claim 1, wherein a target downlink slot contained in the first region is configured at the beginning of the first region, while a target uplink slot corresponding to the target downlink slot is configured at the end of a frame.

5. The base station apparatus according to claim 1, further comprising a section that controls transmission power of a downlink transmission signal assigned to a downlink slot corresponding to an uplink slot, corresponding to a result of detection of a received level of the uplink slot.

6. The base station apparatus according to claim 1, further comprising a spreading section that performs spreading on a downlink transmission signal, and thereby assigns each of subcarriers composing the downlink transmission signal to spreading chips.

7. The base station apparatus according to claim 1, wherein a downlink transmission signal is an OFDM signal obtained by performing IFFT on a transmission signal.

8. The base station apparatus according to claim 1, wherein the band assigning section makes the number of uplink slots and the number of downlink slots assigned to the second region smaller than the number of uplink slots and the number of downlink slots assigned to the first region.

9. A radio communication method comprising:

a timing generating step of generating a timing for assigning an uplink slot and a timing or assigning a downlink slot to a communication frame having time slots; and a band assigning step of providing in the communication frame, in accordance with the timings generated by said timing generating step, both (i) a first region in which the downlink slot is assigned to the beginning of the frame and, after a plurality of downlink slots are collectively assigned, uplink slots are collectively assigned, and (ii) a second region in which the uplink slot is assigned to the beginning of the second region and the uplink slot and the downlink slot are alternately assigned, wherein the band assigning step comprises arranging the second region between the downlink slot and the uplink slot contained in the first region.

* * * * *